US 8,666,203 B2

(12) United States Patent
Cranch

(10) Patent No.: US 8,666,203 B2
(45) Date of Patent: Mar. 4, 2014

(54) OPTICAL FIBRE SENSOR ASSEMBLY

(75) Inventor: Geoffrey A Cranch, Dorset (GB)

(73) Assignee: Optasense Holdings Limited, Farnborough, Hampshire (GB)

( * ) Notice: Subject to any disclaimer, the term of this patent is extended or adjusted under 35 U.S.C. 154(b) by 0 days.

(21) Appl. No.: 13/558,821

(22) Filed: Jul. 26, 2012

(65) Prior Publication Data

US 2012/0293806 A1     Nov. 22, 2012

Related U.S. Application Data

(63) Continuation of application No. 09/958,337, filed as application No. PCT/GB00/01300 on Apr. 6, 2000, now Pat. No. 8,369,660.

(30) Foreign Application Priority Data

Apr. 9, 1999  (GB) .................................. 9908075.6

(51) Int. Cl.
    *G02B 6/00*        (2006.01)
(52) U.S. Cl.
    USPC .......................................................... 385/12
(58) Field of Classification Search
    None
    See application file for complete search history.

(56) References Cited

U.S. PATENT DOCUMENTS

| | | | |
|---|---|---|---|
| 4,784,453 A | 11/1988 | Shaw et al. | |
| 4,956,549 A | 9/1990 | Henning et al. | |
| 5,231,611 A | 7/1993 | Laznicka, Jr. | |
| 5,365,359 A | 11/1994 | Spillman, Jr. | |
| 5,696,857 A | 12/1997 | Frederick | |
| 6,211,964 B1 | 4/2001 | Luscombe et al. | |
| 6,626,590 B1 | 9/2003 | Nagatsu et al. | |
| 7,502,120 B2 | 3/2009 | Menezo | |
| 7,999,946 B2 | 8/2011 | Andersen et al. | |
| 8,369,660 B1 * | 2/2013 | Cranch | 385/12 |
| 2006/0285788 A1 | 12/2006 | Meyer | |
| 2007/0024857 A1 * | 2/2007 | Menezo | 356/478 |

FOREIGN PATENT DOCUMENTS

| | | |
|---|---|---|
| GB | 2 189 110 | 10/1987 |
| JP | 8-101992 | 4/1996 |
| JP | 9-91583 | 4/1997 |
| JP | 9-210740 | 8/1997 |

OTHER PUBLICATIONS

A.D. Kersey, "Demonstration of a Hybrid Time/Wavelength Division Multiplexed Interferometric Fibre Sensor Array" Mar. 28, 1991, IEEE, Electronics Letters, vol. 27, No. 7, pp. 554-555.

Hodgson et al, "Large-scale interferometric fibre sensor arrays with multiple optical amplifiers" Nov. 1, 1997, OSA, Optics Letters, vol. 22, No. 21, pp. 1651-1653.

* cited by examiner

*Primary Examiner* — Arnel C Lavarias
(74) *Attorney, Agent, or Firm* — Nixon & Vanderhye P.C.

(57) ABSTRACT

An optical fiber sensor assembly comprises a source of a plurality of different frequency substantially monochromatic signals (1, 2, 3, 4); a modulator connected to the output of the source to produce a train of output pulses of the monochromatic signals; a plurality of sensor sub-assemblies connected to the output of the modulator, each sub-assembly comprising an optical drop multiplexer (ODM) (13), a sensor array (14) comprising a plurality of sensor elements and an optical add multiplexer (OAM) (15); a wavelength demultiplexer (WDM), having an input coupled to the sub-assemblies output; a plurality of detectors, each detector having an input connected to receive a respective output of the WDM and providing at an output thereof a signal corresponding to a respective frequency of the modulated monochromatic signals; and an interrogation system, having a plurality of inputs connected such that each input receives the output signal from a respective detector.

19 Claims, 5 Drawing Sheets

OPTICAL FIBRE SENSOR ASSEMBLY

This application is a continuation of U.S. application Ser. No. 09/958,337, filed Oct. 9, 2001, which is the US national phase of International Application No. PCT/GB00/01300, filed in English on Apr. 6, 2000, which designated the US and claims priority to GB Application No. 9908075.6 filed Apr. 9, 1999, the entire contents of each of which are hereby incorporated herein by reference.

This invention relates to an optical fibre sensor assembly. More particularly, this invention relates to optical fibre sensor assemblies used to sense changes in temperature, strain, pressure, magnetic fields, electric fields, displacement and acceleration.

Many such assemblies, comprising arrays of sensor elements, have been made. They are optically addressed using a variety of well-known multiplexing techniques and combinations thereof. In such assemblies, the number of sensors that can be multiplexed is limited for a variety of reasons. For example, in a time-division multiplexed array, only about 60 sensors can be multiplexed onto a single launch/return fibre pair. This can be increased by using a combination of time-division multiplexing (TDM) and wavelength-division multiplexing (WDM). This technique has been limited by the requirement to use signals that are relatively well-spaced in the wavelength regime. This restriction of wavelength spacing limits the number of sensors that can be addressed (see A. R. Davis et al, $12^{th}$ Int. Conf. On Optical Fibre Sensors Proceedings, Opt. Soc. America 1997, p. 616-619).

In accordance with the present invention an optical fibre sensor assembly comprises:

a) a source of a plurality of different frequency substantially monochromatic signals;

b) a modulator connected to the output of the source to produce a train of output pulses of the monochromatic signals;

c) a plurality of sensor sub-assemblies connected to the output of the modulator, each sub-assembly comprising an optical drop multiplexer (ODM), a sensor array comprising a plurality of sensor elements and an optical add multiplexer (OAM);

wherein the ODMS are arranged such that a train of single frequency monochromatic signal pulses is applied to the input of each respective sensor array and an optical delay means is provided such that each signal pulse is successively delayed before connection to the respective sensor elements in the sensor array such that each sensor element in the array produces a different time delayed signal at its output with each signal being modulated by the respective sensor element and the OAMs are arranged to provide at a sub-assemblies output the recombined, modulated, time-delayed sensor signal output pulses;

d) a wavelength demultiplexer (WDM) having an input coupled to the sub-assemblies output; and a plurality of outputs; wherein the WDM separates the signals such that each of the different frequency monochromatic signals is transmitted to a respective one of the outputs of the WDM;

e) a plurality of detectors, each detector having an input connected to receive a respective output of the WDM and providing at an output thereof a signal corresponding to a respective frequency of the modulated monochromatic signals; and f) an interrogation system, having a plurality of inputs connected such that each input receives the output signal from a respective detector; the interrogation system and associated sensor arrays being arranged such that the data from each sensor element can be resolved.

This provides a cost-effective and lightweight assembly of environmental sensors. The use of optical add/drop multiplexers means that dense wavelength-division multiplexed signals can be used. This increases the possible number of sensors that can be addressed when compared to conventional TDM/WDM systems.

Preferably the assembly is arranged such that high insertion loss components through which each of the monochromatic signals pass are substantially the same. Hence, the maximum amplitudes of each of the monochromatic signals incident at the detectors are substantially the same.

Preferably, the assembly is arranged such that a signal at one frequency that has been modulated by the sensor array is separated from the remaining signals at different frequencies transmitted through the optical drop multiplexer, such that cross-talk between signals of the same wavelength is minimised. This arrangement reduces cross-talk substantially.

Different arrangements of the sub-assemblies are possible in accordance with the present invention. In one embodiment of the invention, the sub-assemblies are connected in series and a second output of each ODM in a sub-assembly is connected to a second input of the OAM in the sub-assembly; the modulated monochromatic signals at a first frequency incident at the first input of the OAM are combined with the remaining signals at different frequencies incident at the second input of the OAM; and the combined signals at the output thereof are connected to the input of the ODM in a next sub-assembly. This arrangement ensures that each of the monochromatic signals has substantially the same optic path.

In an alternative embodiment, the sub-assemblies are connected in series and a second output of each ODM in a sub-assembly is connected to a next available ODM in a next available sub-assembly and a second input of the OAM in the sub-assembly is connected to the output of the OAM in the next available sub-assembly, such that signals at the output from the OAM in a next available sub-assembly are transmitted to the second input of the OAM in the sub-assembly. An advantage of this embodiment is that if the optic fibre between two sub-assemblies is severed, not all of the information from the assembly is lost.

In a further alternative embodiment, the sub-assemblies are connected together in series; and the second output of the ODM in a sub-assembly is connected to the input of the next available ODM in the next available sub-assembly; the second input of the corresponding OAM in the sub-assembly is connected to the output of the previous available OAM in the previous available sub-assembly; and combined signals from the OAM of the previous available sub-assembly and the signals from the corresponding sub-assembly array are output to a second input of the next available OAM in the next available sub-assembly. This arrangement ensures that the optical paths of all of the monochromatic signals are substantially the same and that if the optical fibre between two sub-assemblies is severed, then not all of the information from the assembly is lost.

The sensor elements may sense any parameter according to the required use, but preferably the sensors sense any of temperature, pressure, strain, electric field, magnetic fields, displacement and acceleration. They may also be used to sense seismic activity.

Preferably, each optical add multiplexer and optical drop multiplexer comprises one of an interference filter and an in-fibre Bragg grating. These are currently the most developed forms of add and drop multiplexers.

Preferably, the source of signals comprises a polychromatic light source, such as a fibre laser light source. The advantage of this is that a wavelength multiplexer is not required because the single source provides the plurality of different monochromatic signals.

Alternatively, the source of a plurality of different frequency signals comprises a plurality of monochromatic light sources and a wavelength multiplexer. These individual light sources are reliable and are currently more readily-available than the polychromatic fibre laser source.

Preferably, amplifiers are provided to balance or boost the monochromatic signals. At least one of these is preferably an erbium doped fibre amplifier. These amplifiers are small, lightweight and provide significant optical gain if placed near to the array. They may also be placed in the water which is important to boost signals from hydrophone arrays, for example.

Cross talk may occur between adjacent detectors, therefore preferably, the assembly further comprises band-pass filters, the filters being arranged so as to minimise cross-talk between adjacent detectors.

Preferably, the sensor elements in each array are arranged in rows and the input to each sensor array is connected so as to transmit the appropriate monochromatic signal to the splitter input of an optical splitter-recombiner having a plurality of outputs such that the monochromatic signal is transmitted to each of the outputs, each output being connected to a respective row of sensor elements by an optical fibre; wherein after modulation by the sensor elements, the monochromatic signals are transmitted to the recombiner inputs of the optical splitter-recombiner via the optical fibre and the recombined, modulated monochromatic signals are transmitted to the input of the OAM.

To allow many sensor elements, typically about 32, to be probed in one sensor array, preferably the optical fibres connected to each row of sensor elements have a series of spaced optical couplers respectively connected to successive sensors in respective rows.

If the assembly is used to sense pressure, then preferably, at least one sensor element comprises a length of optical fibre with a reflective end, the fibre being wound onto a compliant mandril. Preferably, the mandril is covered with foam rubber to provide an effective air backing for the optical fibre windings. This type of sensor is simple to make, relatively inexpensive and sensitive.

Preferably, each detector is a InGaAs detector with a trans impedance amplifier. These give good noise performance and dynamic range.

In a preferred embodiment, the assembly comprises attenuators arranged so as to achieve substantial power equalisation in the signals received by the detectors. Power equalisation is required to balance the signal to noise ratios and prevents saturation of any of the detectors.

In one embodiment, the interrogation system uses one of homodyne and heterodyne techniques. These techniques are commonly utilised to demultiplex time-division multiplexed signals.

Examples of optical fibre sensor assemblies in accordance with the invention will now be described with reference to the following drawings in which.

Figure 1:
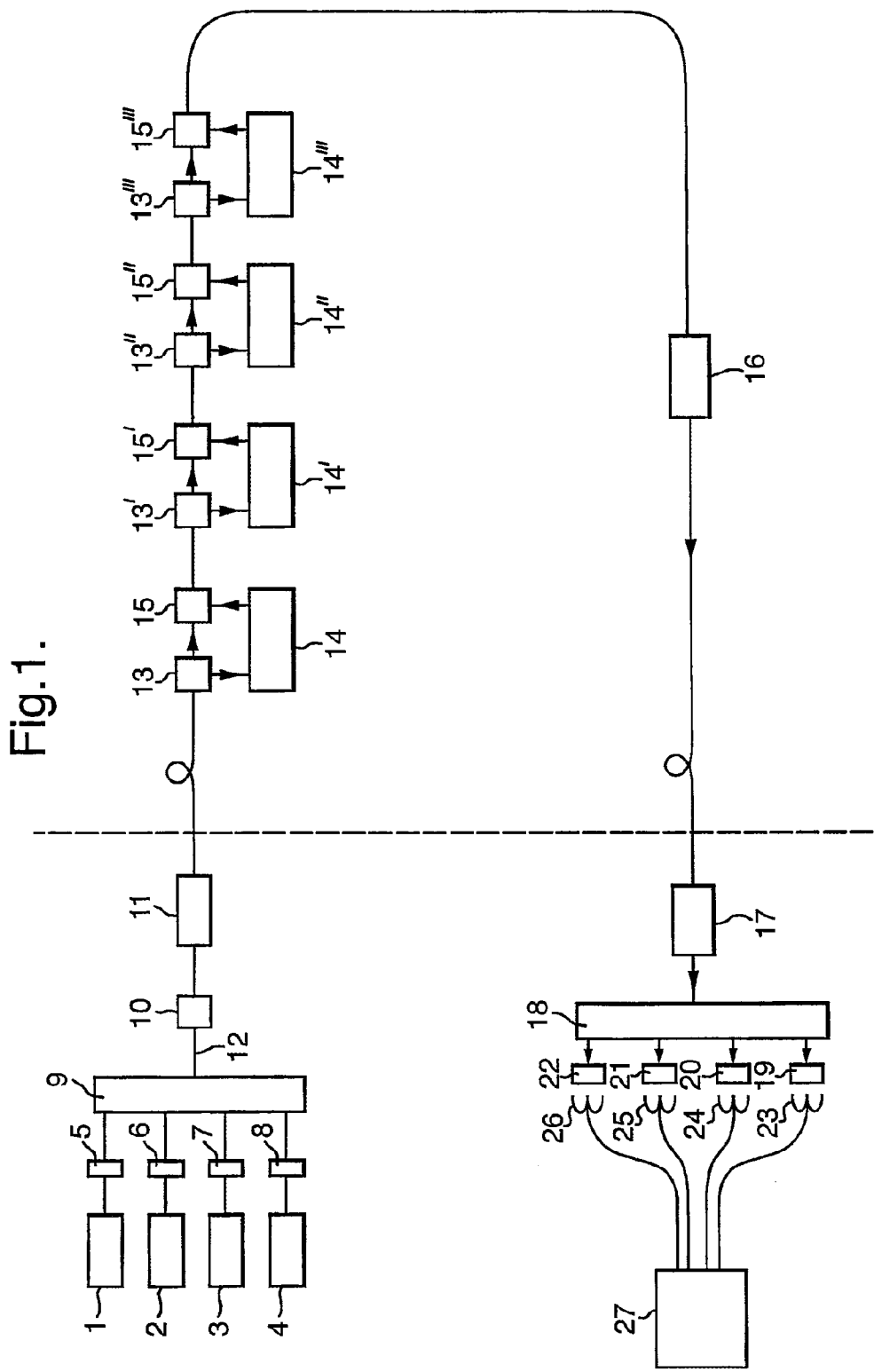
FIG. 1 is a schematic representation of a first example of an optical fibre sensor assembly in accordance with the present invention.
Figure 4:
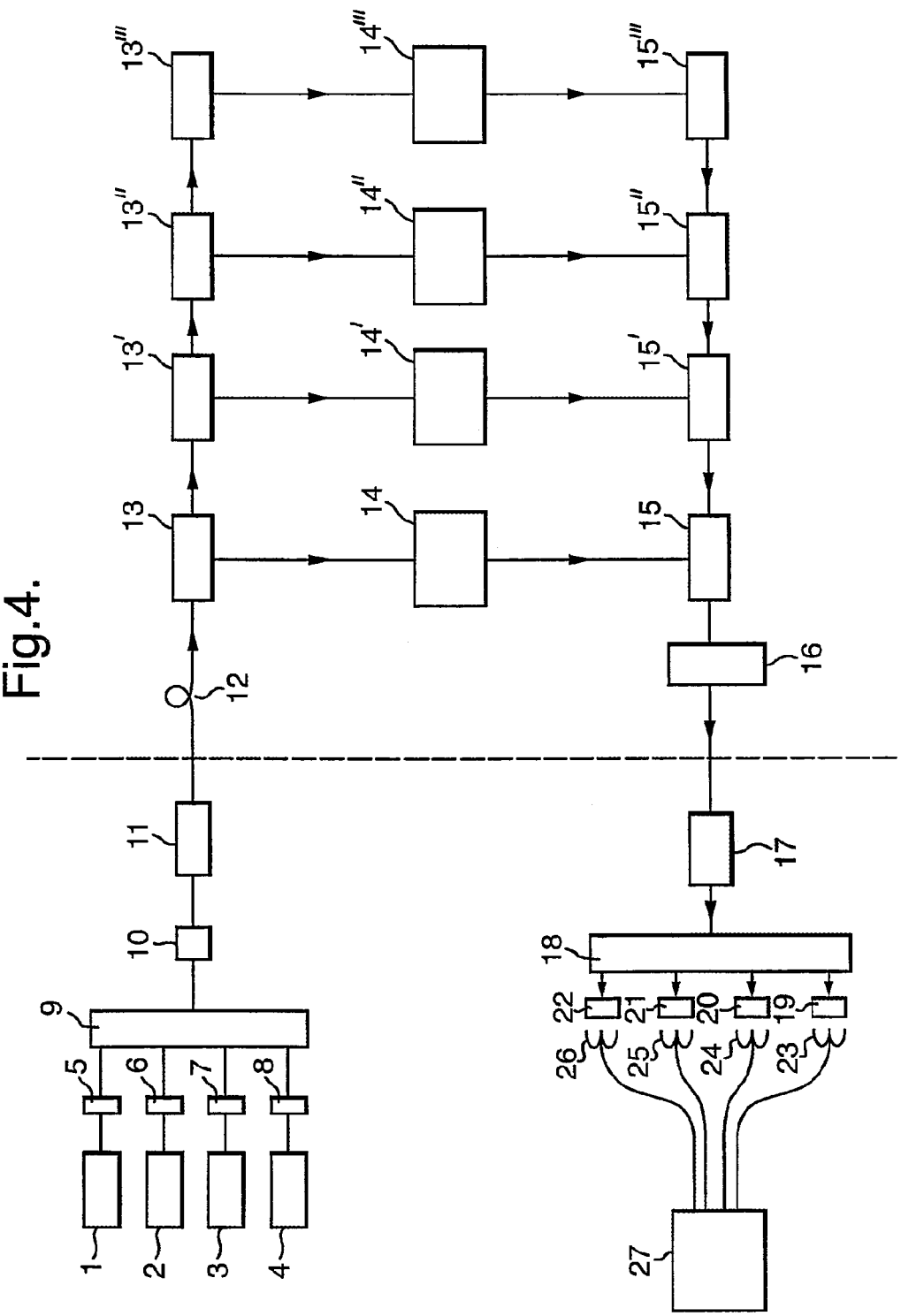
FIG. 4 is a schematic representation of a second example of an optical fibre sensor assembly in accordance with the present invention.
Figure 5:
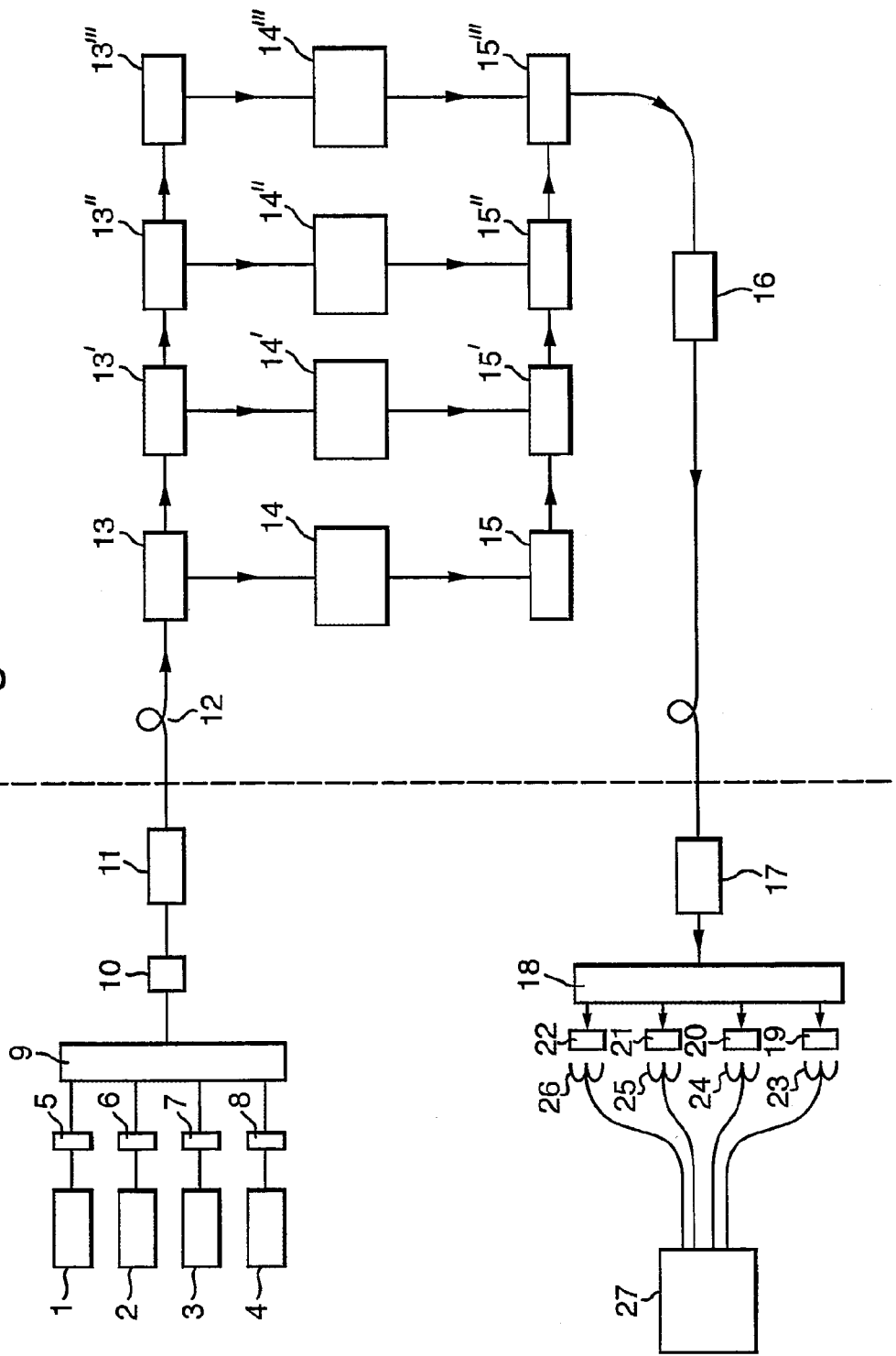
FIG. 5 is a schematic representation of a third example of an optical fibre sensor assembly in accordance with the present invention.

FIGS. 1, 4 and 5 illustrate examples of the present invention for sensor assemblies used to monitor hydrophones. Optical fibres connect the various components of the assemblies together. In this application the term 'dry end' indicates the components that are on-board a ship, whereas the term 'wet end' indicates the components that are in the water.

FIG. 1 shows a schematic representation of a simple optical fibre sensor assembly in accordance with the present invention, comprising a source of a plurality of different substantially monochromatic signals (in this case four, denoted $\lambda_1$, $\lambda_2$, $\lambda_3$, $\lambda_4$), the source comprising four individual monochromatic light sources 1, 2, 3, 4 (each being distributed feedback erbium doped fibre laser sources). There are also four optical attenuators 5, 6, 7, 8; a wavelength multiplexer 9; a pulse generator 10; and a first erbium-doped fibre amplifier (EDFA) 11. These are all in the dry end. In the wet end are four optical drop multiplexers (ODM) 13, 13', 13'', 13''' comprising multilayer interference filters; four sensor arrays 14, 14', 14'', 14'''; four optical add multiplexers (OAM) 15, 15', 15'', 15''' (in this case, multilayer interference filters); and a second EDFA 16 which may be remotely pumped. Also in the dry end are a third EDFA 17; a wavelength demultiplexer 18; four band-pass filters 19, 20, 21, 22 which are either multilayer interference filters or in-fibre Bragg gratings; four InGaAs detectors 23, 24, 25, 26 and a heterodyne interrogation system 27.

The light emitted by the light sources 1, 2, 3, 4, is attenuated by the attenuators 5, 6, 7, 8 such that the intensities of the signals received at the band-pass filters 19, 20, 21, 22 are the same. The attenuated signals are wavelength multiplexed by the wavelength multiplexer (WM) 9 and transmitted via the output of the WM into an optical fibre 12 which transmits the signals to an input of a pulse generator 10. The pulse generator 10 pulse modulates the wavelength multiplexed signal. The resultant signal is then transmitted into the input of an EDFA 11 which amplifies the signal and transmits it via the optical fibre 12 to the input of a first optical drop multiplexer (ODM) 13. One of the monochromatic signals (denoted $\lambda_1$) is transmitted through a first output of the ODM 13 to the input of a sensor array 14. The remaining signals ($\lambda_2$, $\lambda_3$, $\lambda_4$) are transmitted through a second output of the ODM 13 into a first input of an optical add multiplexer (OAM) 15. The monochromatic signal ($\lambda_1$) is transmitted through the array 14 to the individual sensor elements (not shown). The sensor elements modulate the signals and the modulated signals are transmitted via an output of the array to a second input of the OAM 15. The OAM 15 recombines the signals that are transmitted to both of its inputs, and transmits the modulated $\lambda_1$ signal and the unmodulated $\lambda_2$, $\lambda_3$, $\lambda_4$ signals to the input of the next ODM in the series, ODM 13'.

ODM 13' is tuned such that another of the monochromatic signals ($\lambda_2$) is transmitted to the input of the sensor array 14', and the remaining signals (modulated $\lambda_1$ and unmodulated $\lambda_3$ and $\lambda_4$) are transmitted to a first input of the OAM 15'. The $\lambda_2$ signals are modulated by the sensor elements (not shown) in the sensor array 14' and transmitted to a second input of the OAM 15'. The OAM 15' recombines the modulated $\lambda_2$ signals with the signals incident at the other input (modulated $\lambda_1$ and unmodulated $\lambda_3$ and $\lambda_4$). The recombined signals are transmitted via the output of the OAM 15' to the input of the next ODM in the series 13". $\lambda_3$ and $\lambda_4$ signals are modulated by the sensor elements in the sensor arrays 14" and 14'" respectively, and the signals are recombined in a similar manner to that described above for signals $\lambda_1$ and $\lambda_2$.

All of the modulated signals are transmitted from the output of the final OAM in the series 15'" via optical fibre to the input of the second EDFA 16. This is needed to amplify the signals and may be especially important when the optical fibre is very long. The EDFA 16 can be pumped using a separate light source which may be supplied using a second optical fibre (neither are shown). The amplified signals are then transmitted from the output of the EDFA 16 to the input of a third EDFA 17. This third EDFA 17 is in the dry end on-board a ship and is again used to amplify the signals. This amplifier acts as a pre-amplifier and gives large gain to relatively low power signals. The signals are then transmitted from the output of the third EDFA 17 to the input of a wavelength demultiplexer 18. This demultiplexes the signals, $\lambda_1$, $\lambda_2$, $\lambda_3$ and $\lambda_4$, such that each signal is transmitted via a corresponding output in the demultiplexer 18 to the input of respective detectors 23, 24, 25, 26. Before passing to the inputs of the detectors 23, 24, 25, 26, each signal passes through one of the band-pass filters 19, 20, 21, 22. The output of each of the detectors 23, 24, 25, 26 is connected to an input of the interrogation system 27. The interrogation system, using heterodyne detection, measures the phase of interference between signals of the same wavelength and this can be related to changes in length of the sensor elements which, in turn, can be related to changes in physical parameters such as pressure or acceleration. The timing of a signal at a detector is indicative of the sensor element which generated the signal as described below.

Figure 2:
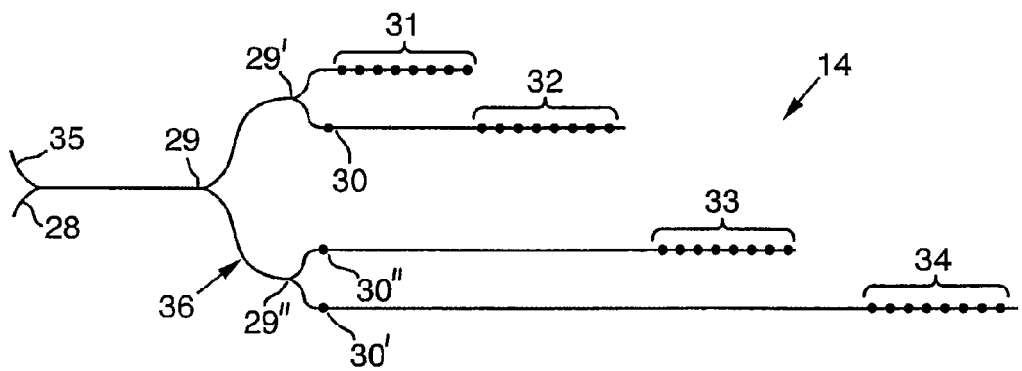
FIG. 2 is a schematic view of a sensor array used in the optical fibre sensor assembly shown in FIG. 1.

A typical sensor array 14 for use with the optical fibre sensor assembly is shown in FIG. 2. The sensor array 14 comprises an input 28; three optical splitters/recombiners 29, 29', 29"; three delay coils 30, 30', 30"; four groups of sensor elements 31, 32, 33, 34, each group comprising eight sensor elements and an output 35. The components are connected by optical fibre 36. A monochromatic signal is transmitted into the array via the input 28. This signal is transmitted through the optical fibre 36 to the groups of sensor elements 31, 32, 33, 34 via the optical splitters/recombiners 29, 29', 29". The signals are transmitted to each sensor element via an optical coupler. The couplers are spaced along a length of optical fibre, as indicated by small dots shown in FIG. 2, such that the optical signals to each sensor are time separated. The signals are then modulated by each individual sensor element, and transmitted via the respective optical coupler to the array output 35 via the recombiner inputs of splitters/recombiners 29, 29', 29". The optical delays differ for each sensor element as shown by the differing lengths of optical fibre. The length of the optical fibre connections and the delay coils 30, 30', 30" are arranged such that the signals from each sensor element can be resolved by an interrogation system 27 as shown in FIG. 1.

Such an array allows the interrogation of up to about 32 sensor elements with one monochromatic signal.

Figure 3:
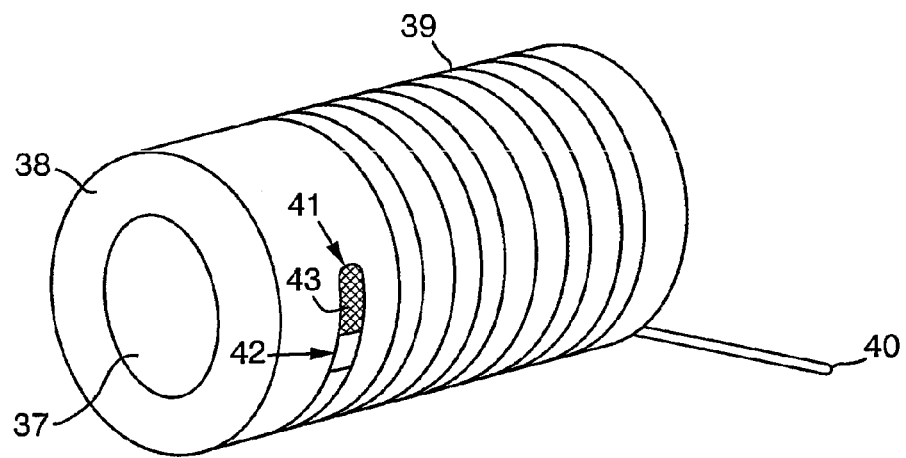
FIG. 3 is a perspective view of a sensor element used in the sensor array shown in FIG. 2.

A typical pressure sensor element that can be used in an optical fibre sensor assembly as a hydrophone is shown in FIG. 3. The sensor element comprises an input 40; a coil of optical fibre 39; an end-piece 41 to the optical fibre comprising a directional coupler 42 with a reflective end 43; a mandril 37 and a foam covering 38. The whole of the sensor element is encapsulated in a compliant material such as epoxy resin (not shown). The length of optical fibre 39 that is wound around the mandril 37 is typically 100 m. The mandril 37 is surrounded with the foam covering 38, which provides an effective air backing for the coil. A monochromatic signal as described above is transmitted to the input 40 of the sensor element. The signal passes along the length of the optical fibre 39 and is reflected by the reflective end 43 of the directional coupler 42, and then passes out of the element via the input 40. The change in length of the optical fibre 37 depends on the temperature, pressure and strain to which the element is subjected and, hence, the time taken by the signal to pass through the sensor element depends on these parameters. Since the passage time of the reflected signal dictates the phase difference between the reflected pulse and a reference pulse, the measurement of interference between the two pulses can be used to determine pressure, for example. The combination of detectors 23, 24, 25, 26 and interrogation system 27 as shown previously in FIG. 1 is used to measure the interference.

The addressing of the individual sensor elements can be seen to be effected as follows. Each monochromatic pulse is sequentially addressed to the individual sensors, row by row as shown. The modulated outputs from the individual sensor elements are then summed to thereby retain the sensor element addresses information. Sensor information is thus time division multiplexed for each of the different array frequencies.

The generic action of the ODMs and OAMs can be explained as follows. The initial pulsed waveform of the four different frequency monochromatic signals is connected to the ODMs such that successively each different frequency signal is stripped from the initial pulse by a respective ODM and connected to a respective array. After processing by the arrays, the different frequency signals are successively added together in respective OAMs to reconstitute the frequency content of the initial waveform.

It will be appreciated that the invention is not limited to the particular sequence of ODMS and OAMs as shown in FIG. 1 and other arrangements will be described below.

An alternative example of an optical fibre sensor assembly in accordance with the present invention is shown in FIG. 4. The optical fibre sensor assembly comprises a source of a plurality of different substantially monochromatic signals, denoted $\lambda_1$, $\lambda_2$, $\lambda_3$ and $\lambda_4$. These are provided by four individual monochromatic light sources 1, 2, 3, 4. In addition there are four optical attenuators 5, 6, 7, 8; a wavelength multiplexer 9; a pulse generator 10; a first erbium-doped fibre amplifier (EDFA) 11; optical fibre 12; four optical drop multiplexers (ODM) 13, 13', 13", 13'"; four sensor arrays 14, 14', 14", 14'"; four optical add multiplexers (OAM) 15, 15', 15", 15'"; a second EDFA 16; a third EDFA 17; a wavelength demultiplexer 18; four band-pass filters 19, 20, 21, 22; four detectors 23, 24, 25, 26 and an interrogation system 27.

The signals are generated and transmitted to the input of an optical drop multiplexer (ODM) 13 as described previously with respect to FIG. 1.

One of the monochromatic signals, $\lambda_1$, is transmitted through a first output of the ODM 13 to the input of a sensor array 14. The monochromatic signal, $\lambda_1$, is transmitted through the array 14 to the individual sensor elements (not shown). The sensor elements modulate the signals and the modulated $\lambda_1$ signals are transmitted via an output of the array 14 to a first input of the OAM 15. The remaining signals ($\lambda_2$, $\lambda_3$, $\lambda_4$) are transmitted through a second output of the ODM 13 into the input of the next ODM in the series, ODM 13'.

ODM 13' is tuned such that one of the monochromatic signals ($\lambda_2$) is transmitted via one of its outputs to the input of the sensor array 14', and the remaining signals (unmodulated $\lambda_3$ and $\lambda_4$) are transmitted via a second output to the input of the next ODM in the series, ODM 14". The monochromatic signals ($\lambda_2$) are modulated by the sensor elements (not shown) in the sensor array 14' and the modulated signals are transmitted via an output of the array 14' to a first input of the OAM 15'. In a manner consistent with that previously described, $\lambda_3$ and $\lambda_4$ signals are modulated by the sensor elements in the sensor arrays 14" and 14''' respectively, and are transmitted via outputs in the arrays 14" and 14''' respectively to a first input of each of the respective OAMs 15" and 15'''.

The modulated $\lambda_4$ signal is transmitted via an output of OAM 15''' into a second input of OAM 15", which transmits the modulated $\lambda_3$ and $\lambda_4$ signals via an output to a second input of OAM 15'. OAM 15' transmits the signals which are incident at its inputs (viz. modulated $\lambda_2$, $\lambda_3$ and $\lambda_4$ signals) through an output to a second input of OAM 15. OAM 15 recombines these signals with the signal incident at the first input (modulated $\lambda_1$). At this sub-arrays output point the modulated signals from all the sub-assembly arrays are all recombined. The recombined signals are then transmitted to the input of the second EDFA 16. The signals are transmitted to the detectors 23, 24, 25, 26 and resolved by the interrogation system 27 as described previously in relation to FIG. 1.

This particular embodiment effectively reduces cross-talk between signals of the same wavelength when compared to the embodiment shown in FIG. 1. This is brought about by separation of the signal that is 'dropped' by one output of the ODM (for example, $\lambda_1$) from any signal of the same wavelength that is transmitted by the other output of the same ODM. Severance of the optical fibre in the assembly shown in FIG. 4 between any two sub-assemblies (or within a sub-assembly) will not lead to a loss of all signals. For example, severance of the optical fibre between ODMs 13' and 13" (launch fibre) will prevent the transmission of signals to sensor arrays 14" and 14''', but not to 14 and 14'. Similarly, severance of the optical fibre between OAMs 15' and 15" (return fibre) will only prevent the transmission of signals from sensor arrays 14" and 14''' to the detectors 23, 24, 25, 26. In the configuration shown in FIG. 4, the optical paths of the different monochromatic signals will be different.

Alternatively, an arrangement such as that shown in FIG. 5 could be used in order to minimise the difference in optical paths between the different monochromatic signals. Optical path is largely determined by the high insertion loss components through which a signal is transmitted, rather than the length of optical fibre, and is not intended to be confused with optical pathlength, which is the distance of flight of a particular signal. The invention relies on signals having slightly different pathlengths in order that signals from individual sensor elements can be resolved. The optical fibre sensor assembly comprises a source of a plurality of different substantially monochromatic signals, $\lambda_1$, $\lambda_2$, $\lambda_3$ and $\lambda_4$, provided by four individual monochromatic light sources 1, 2, 3, 4. There are also provided four optical attenuators 5, 6, 7, 8; a wavelength multiplexer 9; a pulse generator 10; a first erbium-doped fibre amplifier (EDFA) 11; optical fibre 12; four optical drop multiplexers (ODM) 13, 13', 13", 13'''; four sensor arrays 14, 14', 14", 14'''; four optical add multiplexers (OAM) 15, 15', 15", 15'''; a second EDFA 16 which may be remotely pumped; a third EDFA 17; a wavelength demultiplexer 18; four band-pass filters 19, 20, 21, 22; four detectors 23, 24, 25, 26 and an interrogation system 27. The signals are transmitted to the input of an optical drop multiplexer (ODM) 13 as described previously in relation to FIG. 1. One of the monochromatic signals $\lambda_1$ is transmitted through a first output of the ODM 13 to the input of a sensor array 14. The monochromatic signals ($\lambda_1$) are transmitted through the array 14 to the individual sensor elements (not shown). The sensor elements modulate the signals and the modulated signals are transmitted via an output of the array 14 to an input of the OAM 15. The modulated $\lambda_1$ signals are transmitted via the output of OAM 15 to a first input of OAM 15'.

The remaining signals ($\lambda_2$, $\lambda_3$, $\lambda_4$) are transmitted through a second output of the ODM 13 into the input of the next ODM in the series, ODM 13'. ODM 13' is tuned such that one of the monochromatic signals ($\lambda_2$) is transmitted via a first output of the ODM 13' to the input of the sensor array 14', and the remaining signals (unmodulated $\lambda_3$ and $\lambda_4$) are transmitted via a second output to the input of the next ODM in the series, ODM 13". The monochromatic signals ($\lambda_2$) are modulated by the sensor elements (not shown) in the sensor array 14' and the modulated signals are transmitted via an output of the array 14' to a second input of OAM 15'. OAM 15' combines the modulated $\lambda_1$ and $\lambda_2$ signals, transmitting them via an output to a first input of OAM 15". ODM 13" is tuned such that one of the monochromatic signals ($\lambda_3$) is transmitted via a first output of the ODM 13" to the input of the sensor array 14", and the remaining signals (unmodulated $\lambda_4$) are transmitted via a second output of the ODM 13" to the input of the next ODM in the series, ODM 13'''. The monochromatic signals ($\lambda_3$) are modulated by the sensor elements (not shown) in the sensor array 14" and the modulated signals are transmitted via an output of the array 14" to a second input of OAM 15". OAM 15" combines the signals incident at the first input (modulated $\lambda_1$ and $\lambda_2$ signals) with those incident at the second input (modulated $\lambda_3$ signals), transmitting them via an output to a first input of OAM 15'''. ODM 13''' is tuned such that one of the monochromatic signals ($\lambda_4$) is transmitted via a first output of the ODM 13''' to the input of the sensor array 14'''. The monochromatic signals ($\lambda_4$) are modulated by the sensor elements (not shown) in the sensor array 14''' and the modulated signals are transmitted via an output of the array 14''' to a second input of OAM 15'''.

OAM 15''' recombines the signals that are incident at its inputs (modulated $\lambda_1$, $\lambda_2$, $\lambda_3$ and $\lambda_4$) and transmits them via an output, the sub-assemblies output, to the input of the second EDFA 16. The signals are transmitted to the detectors 23, 24, 25, 26 and resolved by the interrogation system 27 as described previously in relation to FIG. 1.

This embodiment minimises the difference in optical path between the different monochromatic signals. It also effectively reduces cross-talk between signals of the same wavelength when compared to the embodiment shown in FIG. 1. This is brought about by separating the signal that is 'dropped' by one output of the ODM (for example, $\lambda_1$) from any signal of the same wavelength that is transmitted by the other output of the same ODM.

In addition to pressure, such an optical fibre sensor assembly may be used to sense, inter alia, displacement, acceleration, strain, temperature, electric and magnetic fields and seismic activity. The sensor element used is selected in dependence upon the parameter to be sensed. ODMS and OAMs may be provided as integrated optical add-drop multiplexers (OADM). The use of OADMs in such a optical fibre sensor assembly allows the use of very densely packed signals (the gaps between wavelengths of signals being less than 1.6 nm and may be as little as 0.8 nm). The OADMs are very light, reducing the weight of the ensemble. The EDFA 16 is advantageous since it is very light and provides significant optical gain if placed near to a sensor array.

It will be appreciated that the combined effect of individual frequency sources, such as separate monochromatic lasers 1-4, and the wavelength multiplexer 9 is to provide a source with the required number (four in this case) of different frequencies. It will be appreciated that this may be replaced by any other equivalent arrangement which will be within the scope of the present invention. The equivalent arrangement may comprise, for example, a distributed feedback laser which is a compact, single source of light capable of generating several monochromatic signals of different frequencies within an optical fibre and capable of transmitting them via this fibre to the array sub-assemblies without need of a wavelength multiplexer 9.

It will be readily apparent to those skilled in the art that it is possible to omit certain optical components (OAMs and ODMs) and still obtain a sensor assembly functioning in accordance with the present invention. For example, in the embodiment shown in FIG. 4 there may be no need for the inclusion of ODM 13''' and OAM 15'''. If ODM 13''' is omitted, then the output of ODM 13''' can be connected directly to an input of sensor array 14'''. Similarly, if OAM 15''' is omitted, then the output of sensor array 14''' would be connected to a second input of OAM 15''. This would decrease the number of required optical components and thus reduce the weight and cost of the system.

In the embodiment shown in FIG. 5, there may be no need for the inclusion of one or both of ODM 13''' and OAM 15. In the case of ODM 13''' being omitted, the output of ODM 13'' would be connected directly to an input of the sensor array 14'''. Similarly, if OAM 15 was omitted, the output of the sensor array 14 would be connected to the second input of OAM 15'. This would decrease the number of required optical components and thus reduce the weight and cost of the system. However, the common optical path would be lost, since the $\lambda_1$ and/or $\lambda_4$ signals would have travelled through one less optical component than the other signals.

Figure 6:
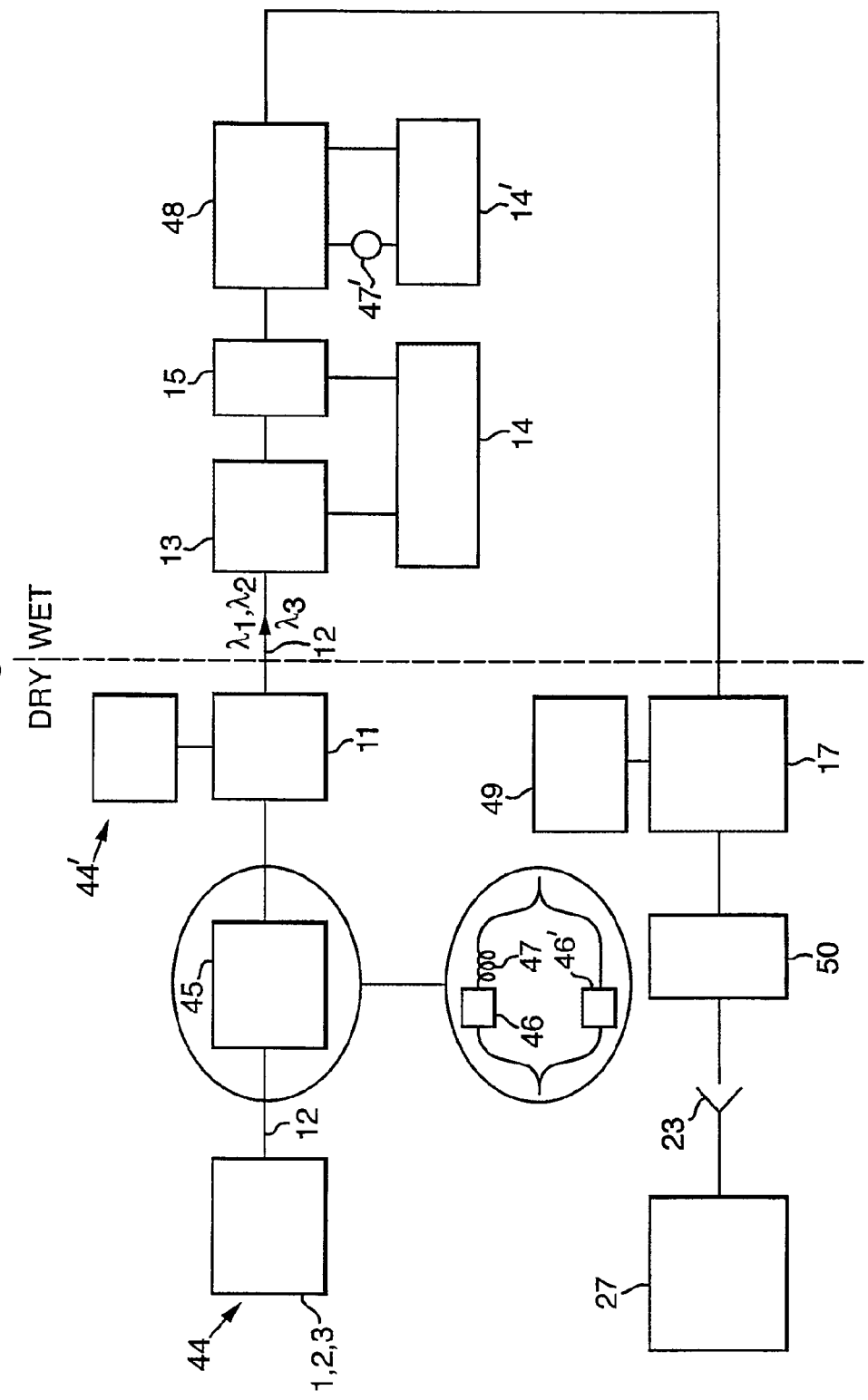
FIG. 6 shows a schematic representation of an experimental arrangement of an optical fibre sensor assembly used to verify the performance of the optical fibre sensor assembly proposed in FIG. 1.

FIG. 6 shows a schematic representation of an experimental arrangement of an optical fibre sensor assembly used to verify the performance of the optical fibre sensor assembly proposed in FIG. 1. The like-numbered components and assembly operate substantially in the manner described with respect to FIG. 1. The experimental arrangement comprises a source of three different substantially monochromatic signals (denoted $\lambda_1$, $\lambda_2$ and $\lambda_3$, 1551.68 nm, 1553.36 nm and 1554.93 nm respectively), of which two ($\lambda_1$ and $\lambda_2$) are actively used in the experiment. The source consists of three separate Erbium (Er) doped fibre laser cavities 1, 2, 3, spliced in series with their composite outputs $\lambda_1$, $\lambda_2$ and $\lambda_3$ launched into a length of Er doped fibre for amplification. Isolators reduce amplifier noise passing through the lasers 1, 2, 3. The source is pumped by a single 100 mW 1480 nm semiconductor pump source and produces approximately 2 dBm of single longitudinal mode and single polarization mode power per wavelength with an optical signal-to-noise ratio of greater than 40 dB.

The outputs of the lasers 1, 2, 3 are launched through an optical fibre 12 into a path balance unit 45, comprising two acousto-optical modulators (AOMs) 46, 46' and a delay coil 47. Each AOM 46, 46' modulate both $\lambda_1$ and $\lambda_2$ light to produce pulses. The delay coil 47 delays the output of one of the AOMs 46, 46' relative to the other by a time equal to twice the transit time in the sensor assembly 14 or 14'. Furthermore, each AOM 46, 46' acts as a frequency shifter. Thus, by driving the AOM at a particular burst sine, the sensor elements (not shown) in a sensor assembly are effectively interrogated by two pulses of light, frequency shifted and separated in time by a period set to twice the transit time in the sensor assembly 14 or 14'. This architecture has the advantage that the effective path imbalance in each of the sensor elements (not shown) is minimised, thus dramatically reducing noise in the system. The pulses transmitted from the path balance unit 45 are then amplified by an Erbium-doped fibre power amplifier 11. The amplifier 11, path balance unit 45, pumps 44, 44' and lasers 1, 2, 3 are all in what would be the dry end of the assembly.

The amplified pulses are then transmitted via a long piece of optical fibre 12 to an optical drop multiplexer (ODM) 13, in this case a JDS Fitel ODM, based on an interference filter. The ODM 13 causes light of wavelength $\lambda_1$ to be transmitted to a sensor array 14 and light of other wavelengths (in this case, $\lambda_2$ and $\lambda_3$) to be transmitted to the input of an optical add multiplexer (OAM) 15, also a JDS Fitel unit. The OAM 15 combines the $\lambda_2$ and $\lambda_3$ light incident at one input of the OAM with the modified signals of $\lambda_1$ light from the sensor array 14. The output of the OAM 15 is transmitted to the input of an optical add drop multiplexer (OADM) 48, based on a Bragg grating Mach-Zehnder interferometer. The OADM 48 causes light of wavelength $\lambda_2$ to be transmitted to a sensor array 14' via a delay coil 47', which is used to reduce cross-talk. The modified signals from sensor array 14' are recombined with signals of other wavelengths by the 'add' function of the OADM 48. In contrast to the JDS Fitel unit, the Mach-Zehnder device provides the drop and add components in a single unit. A description of the mechanisms leading to adjacent channel and intra-channel cross-talk are discussed at length below.

In order to reduce the optical losses between the standard optical fibre 'pigtails' of the 'drop' and 'add' components (13, 15, 48) and the high numerical aperture (NA) fibre used in the sensor arrays 14 and 14', mode matched splices (not shown) were situated between the relevant parts of optical fibre. Such splices are made using a fattening technique and allow fibres with different diameters and different NAs to be spliced together with splice losses less than 0.2 dB.

The sensor arrays 14 and 14' comprised 8 and 4 sensor elements respectively (not shown). Each sensor element comprises a coil of fibre wound onto an air-backed mandrel, providing a sensor of high sensitivity (typically 0.5 rad/Pa) and reasonable bandwidth (in excess of 3 KHz). The coils are spliced serially together and separated by a unidirectional coupler with a reflective mirror attached to one port. The other port of the coupler is index-matched such that reflection only occurs in one direction, ensuring that multi-path reflections are suppressed. The optical powers received from each sensor element are equalised by adapting the coupler ratios of each coupler. The pulses of light from the AOMs 46, 46' are generated as mentioned above such that the return optical signal from each sensor element contains an overlap of the two pulses where one has reflected from the reflective mirror, thus forming the reference signal, and the other has travelled to the sensor element and back.

The sensor arrays 14, 14' and associated 'drop' and 'add' components (13, 15, 48) are in what would be the wet end of the assembly.

The output of the OADM 48 was transmitted to a preamplifier 17, pumped by a 980 nm pump 49. After transmission via optical fibre to the dry end the light was filtered by a tuneable optical filter 50. The output of the filter 50 was then transmitted to a photodiode detector, 23. The output signal from the detector 23 is transmitted to an interrogation system 27, which uses heterodyne detection to demultiplex and demodulate to extract the acoustic signals.

The experimental arrangement was analysed theoretically and experimentally for sources of noise.

There are several likely sources of cross-talk within the assembly, such as cross-talk in the 'add'/'drop' components and cross-talk at the detector 23. Cross-talk in the 'add'/'drop' components can take two forms viz. intra-channel cross-talk and cross-talk between signals from different channels. The latter form of cross-talk involves the transmission of unwanted light (for example, $\lambda_2$ in the cases of sensor array 14) into a given array. This is not thought to be a problem, since the intensity of such unwanted signals is, in general, very low (minimum suppression of 51.8 dB for a drop and add process for such unwanted light).

Intra-channel cross-talk may be more severe. Such cross-talk involves the interference between signals from the sensor array and signals of the same wavelength which have leaked through the 'add' and 'drop' components without passing through the sensor array. Such interference can be problematical but can be reduced by inserting the delay coil 47' between the sensor array 14' and the OADM 48. Hence, intra-channel cross-talk was much reduced for the signals from array 14' compared to those from array 14.

Another likely source of cross-talk may arise due to insufficient suppression of adjacent channel power by the tuneable filter 50, since if adjacent channels are not sufficiently suppressed by the filter, then the heterodyne signals from adjacent arrays will be detected on the photodiode 23. The worst case scenario was simulated by ensuring that the heterodyne signals from both arrays arrive at the photodiode at the same time. The signal received by the photodiode consisted of 3 wavelengths, $\lambda_1$, $\lambda_2$ and $\lambda_3$, with signals of wavelengths $\lambda_1$ and $\lambda_2$ carrying time-multiplexed information. When the tuneable filter 50 is centred on $\lambda_2$, the adjacent channel $\lambda_1$ is suppressed by 37 dB, corresponding to 74 dB in the electrical domain, while the $\lambda_2$ signal remains strong.

In an operational system, the tuneable filter 50 would be replaced by a wavelength demultiplexer to allow simultaneous demultiplexing of all the channels. The adjacent channel isolation should be >35 dB to ensure array-array cross-talk levels of <−70 dB which should be readily achievable with current wavelength demultiplexer technology. If 16 wavelength channels were combined with array modules consisting of 32 TDM sensor elements (in this case, hydrophone elements), a total of 512 hydrophones could be interrogated through a single fibre pair.

This experimental arrangement shows that a sensor assembly in accordance with the present invention allows the interrogation of a large number of sensor elements. The reduction in number of components and fibre required in an array of this architecture would have a significant impact on the overall array cost and would considerably reduce the complexity of the fibre telemetry when compared to an equivalent size array based on TDM only.

The invention claimed is:

1. An optical fibre sensor assembly comprising:
   a source of a plurality of different frequency substantially monochromatic signals, the signals having particular wavelengths, to output said signals in to an optic fibre;
   a plurality of optical drop multiplexers (ODMs), said ODMs arranged along said optic fibre and adapted to successively separate signals of each different wavelength;
   a plurality of sensor arrays, each array comprising a plurality of sensor elements and adapted to receive respective signals of each different wavelength, each sensor element in the array produces a different signal at its output with each signal being modulated by the respective sensor element, the modulation being the time taken by the signal to pass through the sensor element and be reflected by a reflective end of the sensor element;
   a plurality of optical add multiplexers (OAM) arranged successively to combine modulated sensor signals output from said plurality of sensor arrays; and
   an interrogation system, having a plurality of inputs connected such that each input receives the output signal from a respective sensor array, the interrogation system and associated sensor arrays being arranged such that the data from each sensor element can be resolved.

2. An optical fibre sensor assembly as claimed in claim 1, comprising an amplifier to balance or boost the monochromatic signals.

3. An optical fibre sensor assembly as claimed in claim 1, comprising an amplifier to balance or boost the monochromatic signals, wherein the amplifier is remotely pumped.

4. An optical fibre sensor assembly as claimed in claim 1, wherein the ODMs are arranged along a launch optic fibre.

5. An optical fibre sensor assembly as claimed in claim 1, wherein the OAMs are arranged along a return optic fibre.

6. An optical fibre sensor assembly as claimed in claim 1, wherein each ODM comprises an input and first and second outputs, and each OAM comprises an output and first and second inputs; and
   wherein each ODM is grouped with an associated sensor array and a corresponding OAM, the sensor array is adapted to receive signals at a selected wavelength from the first output of the ODM, and to output modulated signals to the first input of said corresponding OAM, wherein the second output of an ODM in a group is connected to a next available ODM in a next available group, and the second input of the OAM in the group is connected to output of the OAM in the next available group, such that signals output from the OAM in a next available group are transmitted to the second input of the OAM in the group.

7. An optical fibre sensor assembly as claimed in claim 1, wherein each ODM comprises first and second outputs and an input, and each OAM comprises an output and first and second inputs; and
   wherein each ODM is grouped with an associated sensor array and a corresponding OAM, the sensor array is adapted to receive signals at a selected wavelength from the first output of the ODM, and to output modulated signals to the first input of said corresponding OAM, wherein the second output of an ODM in a group is connected to a next available ODM in a next available group, and the second input of the corresponding OAM in the group is connected to output of the OAM in a previous available group, such that the combined signals from the OAM of the previous available group and the signals from the corresponding sensor array are output to the second input of a next available OAM in the next available group.

8. An optical fibre sensor assembly as claimed in claim 1, wherein the sensor elements comprise interferometers.

9. An optical fibre sensor assembly as claimed in claim 1, wherein the optical fibre sensor assembly is a seismic sensor assembly.

10. An optical fibre sensor assembly as claimed in claim 1, wherein the sensor elements are used to sense any one of temperature, pressure, strain, electric fields, magnetic fields, displacement and acceleration.

11. An optical fibre seismic sensor assembly comprising:
    a launch fibre and a return fibre, the launch fibre including a plurality of different wavelengths of light;
    a plurality of sensor sub-assemblies connected between the launch fibre and the return fibre, each sensor sub-assembly comprising a sensor array comprising a plurality of individual sensor elements;
    first multiplexers for dropping a wavelength of light from the launch fibre at the connections between the launch fibre and the sensor sub-assemblies, each first multiplexer being arranged to apply the dropped wavelength of light to the sensor array;

second multiplexers for adding the dropped wavelength of light to the return fibre;

an amplifier for boosting the wavelengths of light on the return fibre; and an interrogation system for receiving the wavelengths of light to resolve data from each sensor element.

12. An optical fibre seismic sensor assembly as claimed in claim 11, wherein the first multiplexers comprise an interference filter.

13. An optical fibre seismic sensor assembly as claimed in claim 11, wherein the first multiplexers comprise an in-fibre Bragg grating.

14. An optical fibre seismic sensor assembly as claimed in claim 11, wherein the amplifier is remotely pumped.

15. An optical fibre seismic sensor assembly as claimed in claim 11, wherein the amplifier is an erbium-doped fibre amplifier.

16. An optical fibre seismic sensor assembly as claimed in claim 11, wherein a first wavelength of light is dropped at the connection between the launch fibre and a first sensor sub-assembly and a second wavelength of light is dropped at the connection between the launch fibre and a second sensor sub-assembly by respective first multiplexers for dropping a wavelength of light.

17. An optical fibre seismic sensor assembly as claimed in claim 11, wherein different wavelengths of light are dropped at each connection between the launch fibre and one of the plurality of sensor sub-assemblies.

18. An optical fibre sensor assembly as claimed in claim 11, wherein the sensor elements comprise interferometers.

19. An optical fibre sensor assembly as claimed in claim 11, wherein the sensor elements are used to sense any one of temperature, pressure, strain, electric fields, magnetic fields, displacement and acceleration.

* * * * *